United States Patent [19]

Sugasawa

[11] 4,194,416
[45] Mar. 25, 1980

[54] CONTROL SYSTEM FOR HYDRAULIC PRESSURE REGULATING VALVE IN AUTOMATIC TRANSMISSION CONNECTED TO MULTI-CYLINDER I.C. ENGINE WITH MEANS FOR OPERATING THE ENGINE ON SELECTED CYLINDERS OF ALL

[75] Inventor: Fukashi Sugasawa, Yokohama, Japan
[73] Assignee: Nissan Motor Company, Limited, Yokohama, Japan
[21] Appl. No.: 945,876
[22] Filed: Sep. 26, 1978
[30] Foreign Application Priority Data
Oct. 12, 1977 [JP] Japan ................ 52-121414
[51] Int. Cl.² ............................................ B60K 41/18
[52] U.S. Cl. .................................... 74/859; 74/866
[58] Field of Search ................ 74/859, 860, 866; 123/198 F, 32 EA

[56] References Cited
U.S. PATENT DOCUMENTS

| 3,578,116 | 5/1971 | Nakajima et al. | 123/198 F X |
| 4,061,055 | 6/1977 | Iizuka et al. | 74/859 X |
| 4,144,863 | 3/1979 | Abdoo | 74/860 X |

*Primary Examiner*—C. J. Husar
*Assistant Examiner*—Frank McKenzie
*Attorney, Agent, or Firm*—Lowe, King, Price & Becker

[57] ABSTRACT

When the engine runs on all cylinders thereof, a diaphragm device for a hydraulic pressure regulating valve will operate in response to a pressure difference between the atmospheric pressure and intake vacuum within an intake manifold of the engine. A control system includes a solenoid valve which, when the engine runs on selected cylinders of all, will apply vacuum within a source of a predetermined vacuum to the diaphragm device. According to one preferred embodiment, the diaphragm device has a single chamber and the solenoid valve is adapted to selectively apply the induction vacuum and the predetermined vacuum to the single chamber. According to another preferred embodiment, the diaphragm device has a first chamber in communication with the intake manifold and a second chamber and the solenoid valve is adapted to selectively apply the atmospheric pressure and the predetermined vacuum to the second chamber.

3 Claims, 10 Drawing Figures

4,194,416

CONTROL SYSTEM FOR HYDRAULIC PRESSURE REGULATING VALVE IN AUTOMATIC TRANSMISSION CONNECTED TO MULTI-CYLINDER I.C. ENGINE WITH MEANS FOR OPERATING THE ENGINE ON SELECTED CYLINDERS OF ALL

BACKGROUND OF THE INVENTION

The present invention relates to a control system for a hydraulic pressure regulating valve in a hydraulic control circuit of an automatic transmission connected to a multi-cylinder internal combustion engine which is provided with means whereby the engine may run on selected cylinders of all under light load operating condition.

It is known for the purpose of improving fuel economy to operate a multi-cylinder internal combustion engine on selected cylinders of all under light load condition. It is also known to cut off fuel supply to some cylinders of all, under light load engine operating condition, to let the engine run on the remaining selected cylinders.

In regard to an automatic transmission connected to a multi-cylinder internal combustion engine, it is known that, for the control of the automatic transmission, a line pressure, i.e., a constant hydraulic pressure, is reduced by draining hydraulic fluid through a hydraulic pressure regulating valve (a throttle valve) in response to induction vacuum within the engine intake manifold to provide a throttle pressure, i.e., a hydraulic pressure representing load imposed on the engine.

Explaining into the detail in connection with FIG. 1, induction vacuum within the engine intake manifold is always applied to a diaphragm device 1 to a chamber 2 thereof so that, against a spring 3 biasing a push rod 4 in a direction to push a valve member or spool 4 of a throttle valve 5, the diaphragm device 1 will pull the valve spool 4 toward the right, viewing in this Figure, in response to a pressure difference between the atmospheric pressure and the intake vacuum of the engine. As the intake vacuum increases, a pushing force by the rod 4 pushing the valve spool 6 toward the illustrated position will decrease, thus reducing magnitude of the throttle pressure. Thus, the throttle pressure will represent the load on the engine. However, with the conventional control system in which the diaphragm chamber 2 communicates only with the engine intake manifold, the magnitude of the throttle pressure will no longer represent the actual load on the engine when the engine runs on selected cylinders of all. This problem will be described hereinafter.

In the case of a 6-cylinder internal combustion engine, under the same running condition, the magnitude of induction vacuum is very small when the engine runs on three cylinders of all as compared to that when it runs on all six cylinders thereof (see graph shown in FIG. 2). As a result, the pushing force by the rod 4 will become excessively high when the engine runs on the three cylinders of all, thus increasing the magnitude of the throttle pressure. This will result in that the shifting will not take place at appropriate timings when the engine runs on the selected cylinders of all.

SUMMARY OF THE INVENTION

It is therefore an object of the present invention to provide a control system for a hydraulic pressure regulating valve in a hydraulic control circuit of an automatic transmission, which will provide an appropriate throttle pressure not only when a multi-cylinder internal combustion engine runs on all cylinders, but also when the engine runs on selected cylinders of all.

DESCRIPTION OF THE PREFERRED EMBODIMENTS

The present invention will be described hereinafter in connection with an automatic transmission for an automobile installed with a six-cylinder engine provided with a cylinder selector by which at a light load the engine is controlled to run on selected three cylinders.

Figure 1:
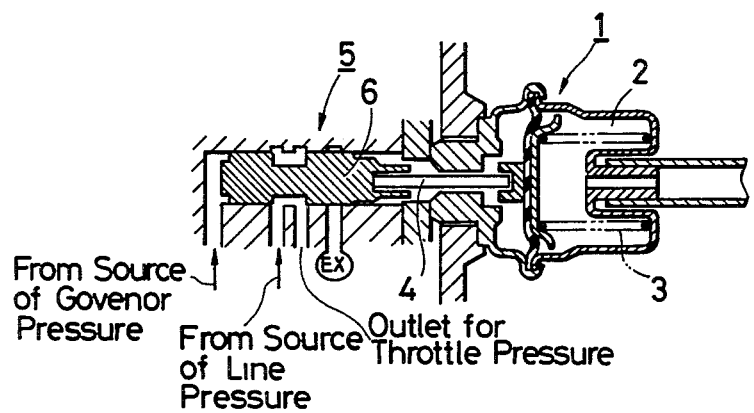
FIG. 1 is a sectional diagram showing a hydraulic pressure regulating valve (throttle valve) and a diaphragm device for the regulating valve.
Figure 2:
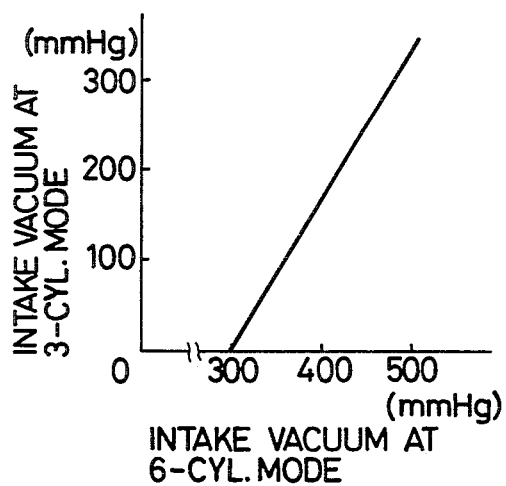
FIG. 2 is a graph showing the magnitude of induction vacuum when the engine runs on selected three cylinders of all against the magnitude of induction vacuum when the engine runs on all of the cylinders.
Figure 3:
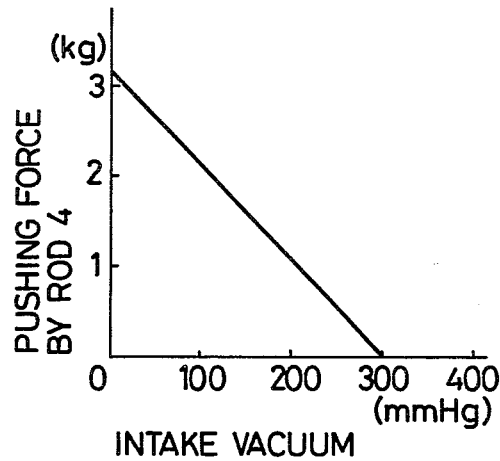
FIG. 3 is a graph showing a pushing force by the rod 4 against the magnitude of induction vacuum.

When, as shown in FIG. 1, a diaphragm device 1 is employed having a characteristics which is adjusted, as shown in FIG. 3, so as to yield a throttle pressure which meets the required magnitude for the engine operation on 6-cylinder mode, the following problem arises when the engine runs on selected three cylinders. With the diaphragm device 1, the pushing force of the actuating rod 4 is maximum, the magnitude of which is equal to the biasing force of the diaphragm spring 3, when the accelerator pedal is depressed to such a position as to cause the engine intake manifold vacuum to approach to zero, and the pushing force linearly decreases as the intake vacuum increases in accordance with the release of the accelerator pedal. The pushing force of the actuating rod 4 is zero when the engine intake vacuum is at 300 mmHg. However, as shown in FIG. 2, at the same engine load, the engine intake vacuum is substantially zero when the engine runs on three cylinders, while, the engine intake vacuum is 300 mmHg when the engine runs on six cylinders. Therefore, the accelerator pedal must be depressed to the fully depressed position when the engine runs on three cylinders under the same load where the intake vacuum is 300 mmHg when the engine runs on six cylinders. It follows that the engine load range where the engine can run on three cylinders corresponds to the engine load range where the engine intake vacuum is larger than 300 mmHg when the engine runs on six cylinders. Thus, if the pushing force by the actuating rod 4 is maintained zero whenever the engine runs on three cylinders, an appropriate throttle pressure can be obtained over the whole operating range of the engine which is operable on three cylinders.

Based on this recognition, according to the invention a predetermined constant vacuum higher than 300 mmHg is introduced into a power chamber 2 of a diaphragm device 1 (see FIG. 1) whenever the engine runs on three cylinders.

Figure 4:
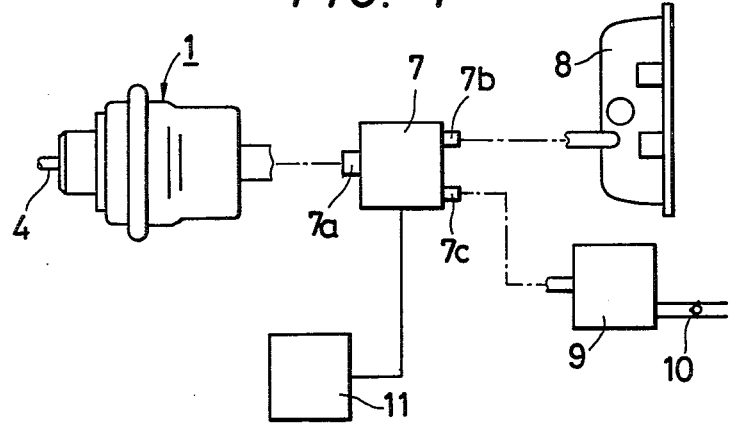
FIG. 4 is a schematic diagram showing a first preferred embodiment of a control system according to the present invention.

Referring to the preferred embodiment of the invention shown in FIG. 4, a power chamber 2 of a diaphragm device 1 (see FIG. 1 also) is connected with a port 7a of a solenoid operated three way valve 7 whose other two ports 7b and 7c are connected with an intake manifold 8 and a vacuum tank 9, respectively. The vacuum tank 9 is connected with a suitable vacuum source via a check valve 10, so that the vacuum within the vacuum tank 9 is maintained at a constant vacuum higher than 300 mmHg. The solenoid valve 7 is electrically connected with a cylinder selector circuit 11 and normally connects the port 7a to the port 7b and disconnect the port 7a from the port 7c when the engine run on six cylinders, but connects the port 7a to the port 7c and disconnects the port 7a from the port 7b when it receives a cylinder selection signal from the cylinder selector circuit 11 representing the condition when the engine runs on three cylinders.

Figure 6:
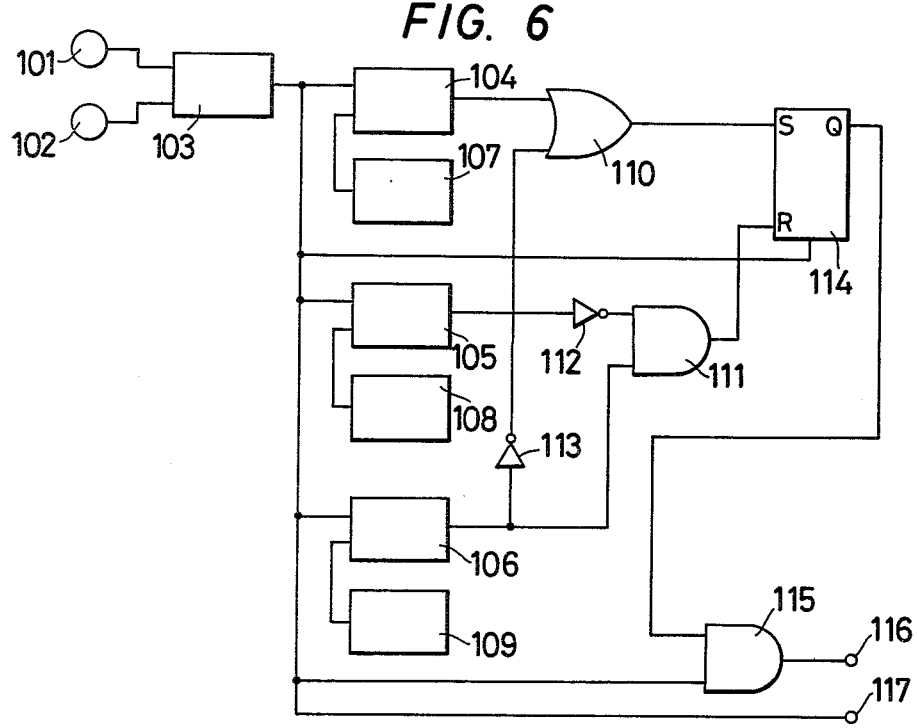
FIG. 6 is a circuit diagram showing the cylinder selector.

Explaining the cylinder selector circuit 11 in connection with FIG. 6, an engine intake air flow sensor 101 and an engine revolution sensor 102 are provided to produce outputs representing the intake air flow, in quantity, and representing the engine revolution speed (RPM), respectively. These outputs from the sensors 101 and 102 are fed to a fuel injection control unit 103 which produces a fuel injection signal whose pulse width representing the engine load of the engine under the control. Comparators 104, 105 and 106 are provided together with two pulse width level adjusters 107 and 108 and an engine revolution speed level adjuster 109. The comparator 104 compares the pulse width signal $W_P$ with a high predetermined pulse width level signal $W_{PH}$ and produces a high level signal "1" only when $W_P$ is greater than $W_{PH}$ ($W_P > W_{PH}$), while, the second comparator 105 compares the signal $W_P$ with a low predetermined pulse width signal $W_{PL}$ and produces a high level signal "1" when $W_P$ is greater than $W_{PL}$ ($W_P > W_{PL}$). The comparator 106 determines the engine revolution speed from the frequency of pulses of the fuel injection signal from the fuel injection control unit 103 and compares the engine revolution speed signal $N_E$ with a predetermined engine revolution speed level $N_{EO}$ to produce a high level signal "1" when $N_E$ is greater than $N_{EO}$ ($N_E > N_{EO}$). The outputs from these comparators remain at a low level signal "0" outside of the predetermined conditions as above. An OR circuit 110 and an AND circuit 111 are provided. The output from the comparator 104 is fed to one of two inputs of the OR circuit 110 and the output from the comparator 106 is fed to the other input of the OR circuit 110 through an inverter 113. The output from the comparator 106 is fed to one of two inputs of the AND circuit 111 and the output from the comparator 105 is fed to the other input of the AND circuit 111 through an inverter 112.

Figure 5:
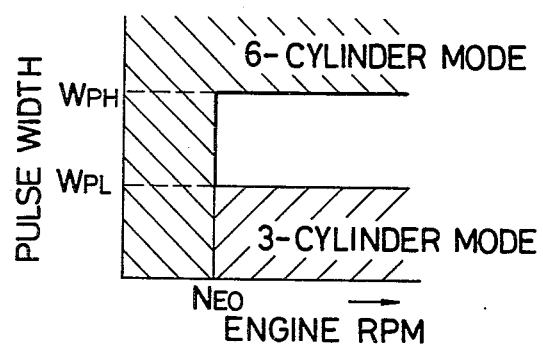
FIG. 5 is a diagram explaining operational modes of the engine operated by the cylinder selector apparatus shown in FIG. 6.

The output of the OR circuit 110 is fed to "S" (set) terminal of a flip-flop circuit 114 and the output of the AND circuit 111 is fed to "R" (reset) terminal thereof. When $W_P > W_{PH}$ and/or $N_E < N_{EO}$, a high level signal "1" appears as the output from the OR circuit 110 and a low level signal "0" appears outside this condition. Meanwhile, a high level signal "1" appears as the output from the AND circuit 111 when $W_P < W_{PL}$ and $N_E > E_{EO}$ and a low level signal "0" appears outside this condition. The flip-flop circuit 114 produces at its Q output terminal a high level signal "1" when the engine operating condition is within a 6-cylinder region diagrammatically illustrated in FIG. 1 and continues to produce the high level signal "1" until the engine operating condition falls into 3-cylinder region shown in FIG. 5. When the engine operating condition has fallen into 3-cylinder mode, the output on the Q terminal switches to a low level signal "0" and this low level signal "0" will be maintained until the engine operating condition falls into the 6-cylinder mode range shown in FIG. 5. The Q output is fed to one of two input terminals of an AND circuit 115 whose the other input terminal receives the fuel injection signal from the fuel injection control unit 103. When a high level signal "1" appears on the Q output terminal of the flip-flop circuit 114, and AND circuit 115 will permit the passage of the fuel injection signal therethrough toward a terminal 116 operatively connected with fuel injection nozzles adapted to supply fuel to cylinders #1 to #3 so that under this condition the fuel injection nozzles for these cylinders inject fuel in response to fuel injection signal from the fuel injection control unit 103. Since the fuel injection signal is always supplied via a terminal 117 to three fuel injection nozzles for the other three cylinders #4 to #6, the engine operates on six cylinders under this condition. When the signal on the Q output terminal of the flip-flop circuit 114 switches to a low level signal "0", the AND gate 115 is closed to prevent the passage of fuel injection signal therethrough toward the terminal 16 so that fuel injection to cylinders #1 to #3 will be suspended. Thus, under this condition, the engine runs on three cylinders #4 to #6.

The cylinder selector circuit 11 feeds to the solenoid valve 7 (see FIG. 4) a 6-cylinder mode signal when the engine runs on six cylinders and a 3-cylinder mode signal when the engine runs on three cylinders. The solenoid valve 7 takes a position in which the port 7a is connected to the port 7b when it receives the 6-cylinder mode signal. Under this condition, the intake manifold vacuum is introduced into the diaphragm device 1 from the intake manifold 8 so as to cause the throttle valve 5 to produce a throttle pressure in response to the engine load. When the switching valve 7 receives the 3-cylinder mode signal, the solenoid valve 7 changes its condition to take another position in which the port 7a is connected to the pot 7c instead of the port 7b. Under this condition, the constant vacuum higher than 300 mmHg is supplied to the diaphragm device 1 from the vacuum tank 9. Thus proper throttle pressure is obtained from the throttle valve 5 even when the engine runs on three cylinders.

Figure 7:
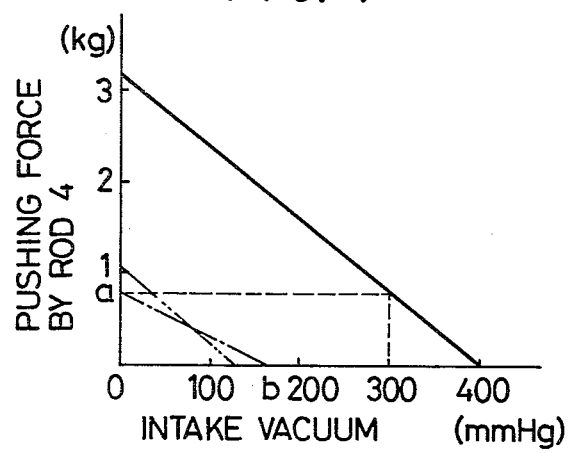
FIG. 7 is a graph explaining ideal relationships between the pushing force by the rod 4 and the magnitude of induction vacuum when the engine runs on selected three cylinders of all.

Instead of the diaphragm device having a characteristic curve as shown in FIG. 3, a diaphragm device having a characteristic curve as shown by the solid line in FIG. 7 may be used to provide proper throttle pressure during the engine operation modes when the engine runs on six cylinders. As shown by the solid line in FIG. 7, the pushing force is zero when the intake manifold vacuum supplied to the diaphragm device is 400 mmHg and increases gradually up to approximately 3.2 kg as the intake manifold vacuum decreases. It will be noted, as compared to the characteristic curve of the diaphragm device 1 shown in FIG. 3, that the pushing force is not zero at 300 mmHg.

In the case when the above mentioned diaphragm device is used, the ideal characteristics between the pushing force and the vacuum is as shown by one dot chain line in FIG. 7 so as to provide proper throttle pressure when the engine runs on three cylinders, which has been determined from the induction vacuum relationships shown in FIG. 2. A point a on the one dot chain line is determined from the fact that the pushing force of the actuating plunger of a diaphragm device when the engine induction vacuum is zero during 3-cylinder mode engine operation must be the same as that when the engine induction vacuum is 300 mmHg during 6-cylinder mode engine operation because the engine induction vacuum of zero at 3-cylinder mode corresponds to the engine induction vacuum of 300 mmHg at 6-cylinder mode. Another point b on the one dot chain line is determined in a similar manner. It will therefore be understood that the one dot and chain line represents the characteristic of a diaphragm device required or suitable for producing the proper throttle pressure in response to the engine load when the engine runs on three cylinders.

It turned out to be quite difficult from the constructional point of view to modify a diaphragm device presenting the characteristic as shown in solid line in FIG. 7 so that it will present the characteristic as shown by the one dot chain line shown in FIG. 7 because the both characteristic representing lines have different tangential angles. In this case it is possible to modify the diaphragm device so that it will represent the characteristic as shown by two dots chain line as shown in FIG. 7 when the engine runs on three cylinders, because the two-dots chain line has the same tangent angle as that of the solid line. Even with the characteristic as shown by the two-dots chain line, it turned out that there is little effect on the operation of the transmission upon its shifting as compared to the case with the characteristic as shown by the one dot and chain line. Based on the recognition a diaphragm device 12 as shown in FIG. 8 has been developed.

Figure 8:
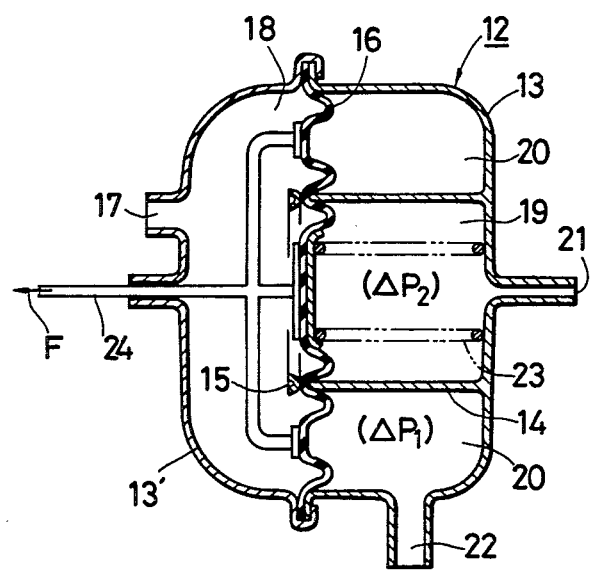
FIG. 8 is a sectional view of a diaphragm device used in a control system shown in FIG. 10.

A diaphragm device 12 shown in FIG. 8 has formed within a cup shaped outer shell 13 a cylindrical wall 14 extending from the center portion of the bottom of the cup shaped outer shell 13. The cylindrical wall 14 has a free axial end and between this axial end and a cramp ring 15 the central portion of a diaphragm 16 is hermetically interposed. The diaphragm 16 has an circumferential portion interposed between the cup shaped outer shell 13 and another cup shaped outer shell 13' which form a housing of the diaphragm device 12. The diaphragm 16 divides the interior of the housing into an atmospheric chamber or first chamber 18 in communication with the atmosphere through a port 17, a second chamber 19 within the cylindrical wall 14 and a third chamber 20 around the cylindrical wall 14 between it and the outer shell 13. The outer shell 13 has a port 21 in communication with the second chamber 19 and another port 22 in communication with the third chamber 20. A spring 23 is disposed within the chamber 19 with one end thereof bearing against the central portion of the bottom wall of the shell 13 and the opposite end bearing against the central portion of the diaphragm 16 closing the chamber 19. A rod 24 extends through the shell 24 into the chamber 18 and fixedly secured to the diaphragm 16 at the central area thereof opposite to the chamber 19 and also at the outer area of the diaphragm 15 opposite to the chamber 20.

Figure 9:
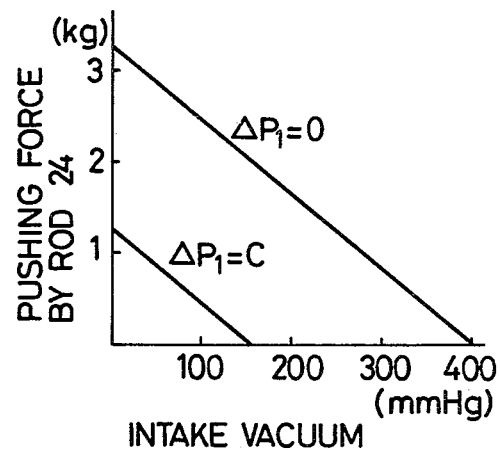
FIG. 9 is a graph showing the performance of the system shown in FIG. 10.

In the diaphragm device 12, the pushing force F of the rod 24 is equal to the biasing force of the spring 23 when the pressures within the chambers 18, 19 and 20 are the same, atmospheric level in this embodiment, and the biasing force of the spring 23 is set at 3.2 kg, that is the amount required as the pushing force of the rod 24 when the induction manifold vacuum is zero as shown by the solid line in FIG. 7. The pushing force F when the vacuums are introduced into the chambers 19 and 20 can be expressed as follows:

$$F = f - A_1 \cdot \Delta P_1 - A_2 \cdot \Delta P_2$$

wherein:

f : the biasing force of the spring 23
$\Delta P_1$ : the vacuum within the chamber 20
$\Delta P_2$ : the vacuum within the chamber 19
$A_1$ : the effective working area of the diaphragm 16 subjected to the vacuum $\Delta P_1$
$A_2$ : the effective working area of the diaphragm 16 subjected to the vacuum $\Delta P_2$ Taking $\Delta P_1$ as a parameter, the pushing force F as against the induction vacuum as the $\Delta P_1 = 0$ or $\Delta P_1 = C$ (constant) varies as shown in FIG. 9. As will be readily understood from this figure, the varying characteristic of the pushing force F as against the induction vacuum as $\Delta P_1 = 0$ corresponds to that shown by the solid line in FIG. 7. If the amplitude of C is determined, it is possible to correspond the varying characteristic of the pushing force F as against the induction vacuum as $\Delta P_1 = C$ corresponds to that shown by the two-dots chain line in FIG. 7.

Figure 10:
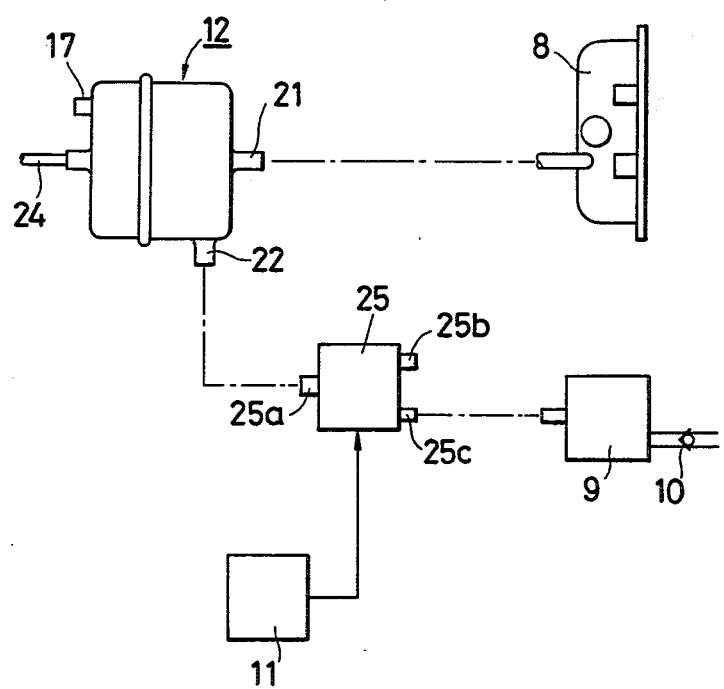
FIG. 10 is schematic diagram of a second preferred embodiment of a control system according to the invention.

Therefore, employing the diaphragm device 12 as shown in a system shown in FIG. 10 will cause the throttle valve actuated by the diaphragm device 12 to produce the proper throttle pressure in response to the engine load.

In FIG. 10, the same reference numerals as used in FIG. 4 are employed to designate the similar parts. As shown in this figure, the port 21 of the diaphragm device 12 is connected to the engine intake manifold 8, while, the port 22 thereof is connected to the port 25a of the solenoid operated three way valve 25. The solenoid valve 25, when it receives the 6-cylinder mode signal from the cylinder selector 11, will connect the port 25a to the port 25b communicating with the atmosphere. When it receives the 3-cylinder mode signal, the solenoid valve 25 cuts off fluid connection between the ports 25a and 25b and connects the port 25a to the port 25c connected to the vacuum tank 9 whose interior pressure is maintained at C level.

In operation, during the engine operation on six cylinders (6-cylinder mode) the chamber 20 (see FIG. 8) of the diaphragm device 12 is permitted to communicate with the atmosphere, and the engine induction vacuum is supplied from the intake manifold 8 to the chamber 19. Under this condition the diaphragm device reveals the characteristic as shown by the solid line in FIG. 7 so that the proper throttle pressure as required during the engine operation on six cylinders can be obtained.

During the engine operation on three cylinders, the constant vacuum (C) within the vacuum tank 9 is supplied to the chamber 20 (see FIG. 8) so that the diaphragm device 12 will reveal the characteristics as shown by two dot chain line in FIG. 7, thus allowing the proper throttle pressure as required during the 3-cylinder mode engine operation.

What is claimed is:

1. A control system for a hydraulic pressure regulating valve in a hydraulic control circuit of an automatic transmission connected to a multi-cylinder internal combustion engine to be driven thereby, the engine having an intake manifold as a source of induction vacuum and being provided with means for operating the engine on selected cylinders of all under a predetermined engine operating condition, said control system comprising:

a source of a predetermined vacuum;
   a diaphragm device operatively connected to said hydraulic pressure regulating valve, said diaphragm device including a spring means for biasing a valve member of said hydraulic pressure regulating valve in one direction, and a diaphragm operatively connected to said valve member and having one side in communication with the atmosphere;
   fluid network means, including a valve means, for connecting said diaphragm device to said intake manifold and to said source of the predetermined vacuum to cause said diaphragm device to move said valve member, in the opposite direction against said spring means, in response to a pressure difference between the atmospheric pressure and the induction vacuum within said intake manifold; and
   said valve means being operable in response to a signal representing that said engine runs on the selected cylinders of all for applying the predetermined vacuum to said diaphragm device on the opposite side of said diaphragm to help said diaphragm device in moving said valve member in the opposite direction.

2. A control system as claimed in claim 1, in which
   said diaphragm device includes a chamber with which said diaphragm communicates at the opposite side thereof, and in which
   said valve means has a first position in which communication between said chamber and said intake manifold is established and communication between said chamber and said source of the predetermined pressure is cut off, and has a second position in which the communication between said chamber and said intake manifold is cut off and the communication between said chamber and said source of the predetermined vacuum is established.

3. A control system as claimed in claim 1, in which
   said diaphragm device includes a first chamber and a second chamber, said diaphragm communicating at the opposite side thereof with said first and second chamber; in which
   said fluid network means includes a conduit establishing constant fluid communication between said first chamber and said intake manifold; and in which
   said valve means has a first position in which communication between said second chamber and the atmosphere is established and communication between said second chamber and said source of the predetermined vacuum is cut off and has a second position in which the communication between said second chamber and the atmosphere is cut off and the communication between the second chamber and the source of the predetermined vacuum is established.

* * * * *